Patented Oct. 22, 1929

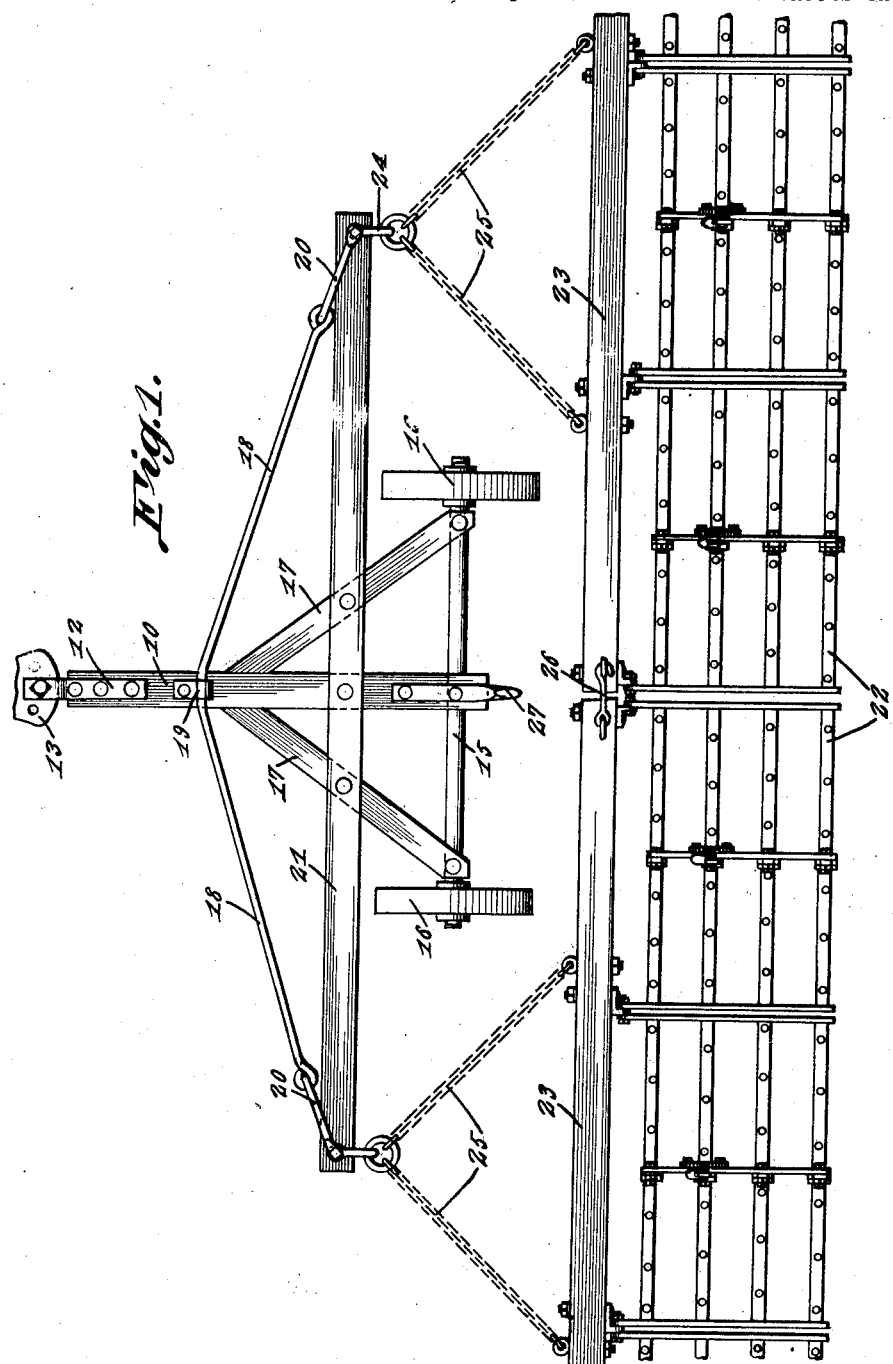

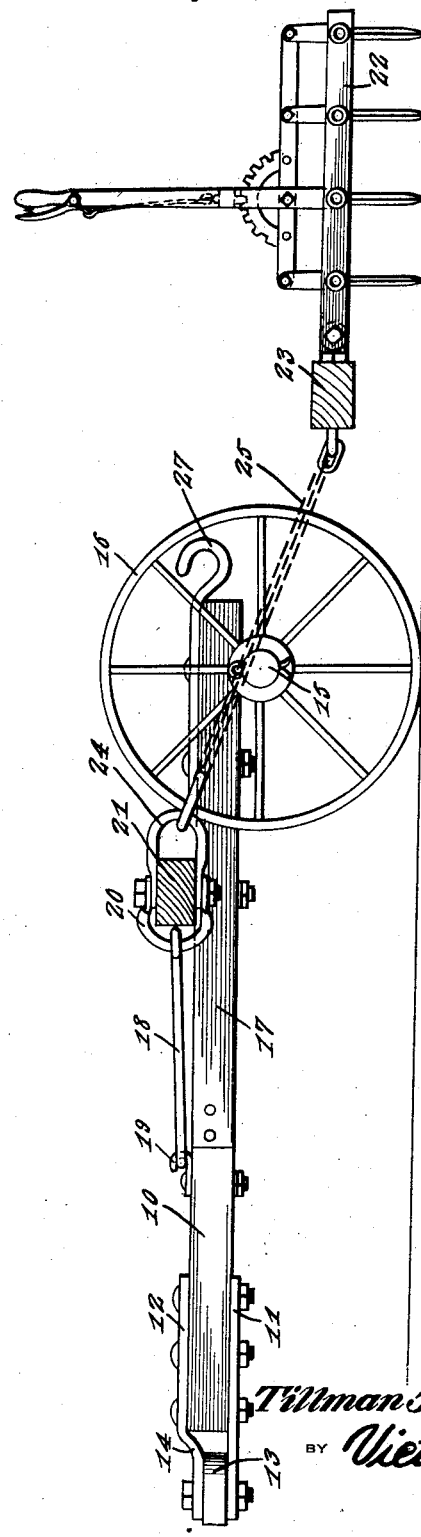

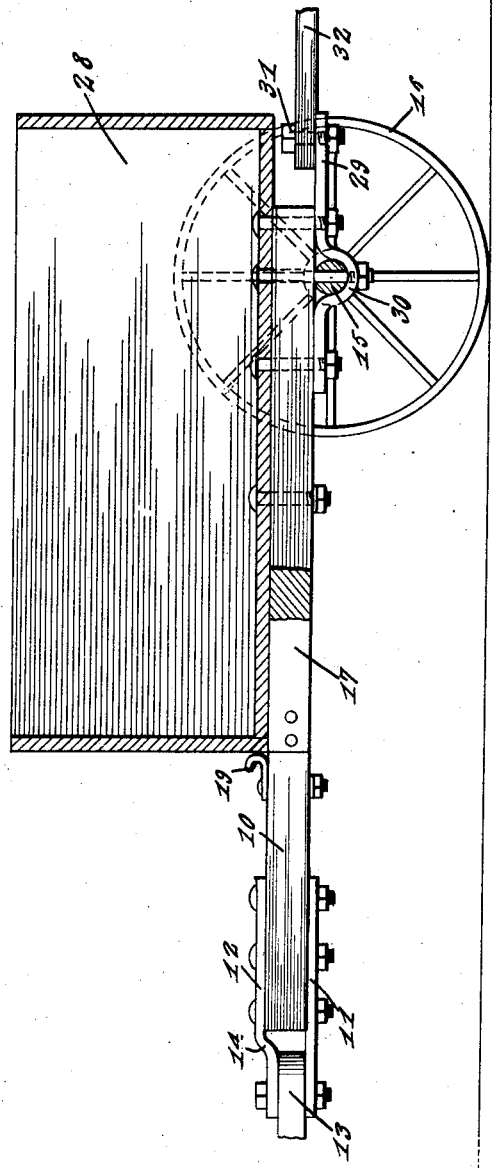

1,732,989

UNITED STATES PATENT OFFICE

TILLMAN SCRABECK, OF HARMONY, MINNESOTA

HARROW HITCH

Application filed September 4, 1928. Serial No. 303,689.

This invention relates to hitching devices for agricultural implements upon tractors.

An object of the invention comprehends wheels for the hitch devices preferably located within the rear thereof to permit employment of shorter bars whereby the device may be readily passed through gates, etc.

Another object of the invention contemplates a bar member carried by the hitch device and having connection with implements at the ends thereof.

More specifically stated the couplings between the bar and implements are made short incident to the particular disposition of the bar whereby the draft will be lightened.

With the above and other objects in view, the invention further consists in the following novel features and details of construction, to be hereinafter more fully described, illustrated in the accompanying drawings and pointed out in the appended claims.

In the drawings:—

Figure 1 is a top plan view of the invention.

Figure 2 is a side elevation thereof partly in section to illustrate the connection between the implement and bar.

Figure 3 is a longitudinal sectional view taken through the invention illustrating the arrangement of a wagon body upon the hitch device.

Referring to the drawings in detail, wherein like characters of reference denote corresponding parts, the reference character 10 indicates a tongue having coupling plates 11 and 12 carried upon the under and upper sides thereof and which are adapted to accommodate the adjacent end of a tractor coupling 13 between the outermost projecting ends thereof. The outermost end of the coupling plate 12 is downwardly and outwardly obliquely disposed, as indicated at 14, whereby the tractor 13 when disposed between the plates 11 and 12 will not be permitted excess reciprocating action.

An axle 15, carrying wheels 16 upon the extremities thereof, is adapted for connection upon the upper side thereof with adjacent ends of brace bars 17 obliquely disposed therefrom in the manner as best illustrated in Figure 1 of the drawings and connected at their opposite ends with the opposed sides of the tongue 10.

A truss rod 18, having connection at an intermediate point in its length with a hook 19 carried upon the upper side of the tongue 10, is adapted to accommodate clevis yokes 20 at its ends carried upon the extremities of a bar 21. Said bar is supported upon the upper sides of the tongue and braces therefor.

Harrows or other implements, such as indicated at 22, and having evener bars 23 upon the forward sides thereof, are adapted for connection with yokes 24 carried upon the ends of the bar through the instrumentality of chain connections 25. Said chains are connected with the outermost ends and points eccentric thereon to clear the ground engaging wheels 16, whereby shorter bars 21 may be employed to facilitate ingress and egress from one field to another through gates.

As illustrated in Figure 1 of the drawing, two harrows are employed, and inasmuch as the latter are eccentrically connected with the ends of the bar, a detachable connection in the nature of a hook 26 is provided adjacent the meeting ends of the evener bars 23, whereby the two harrows may be dragged as a unit.

A hook 27, carried upon the upper side and lowermost end of the tongue 10, is adapted for connection with the chains 25 of the harrows whereby the latter will follow directly behind the hitching device when passing through gates, etc.

From the illustration in Figure 3 of the drawings, it is noted that the bar 21, truss 18, and hook 27 are removed and a wagon box 28 bolted or otherwise secured to the upper surfaces of both the tongue 10 and the braces 17 therefor. The wagon boxes are adapted to carry tractor fuel and oil when the entire apparatus is transported from place to place. For this reason the hook 27 is removed and a coupling plate 29 employed. Said plate is provided with a semi-circular transversely disposed groove portion 30 adapted to accommodate the adjacent portion of the axle 15 and to receive the adjacent ends of the bolt members anchoring the wagon box upon the tongue and braces. The lowermost projecting end of the plate 19 is apertured to accommodate a pin 31 passed through the adjacent end of a tongue 32 extended from a separator or other implement, not shown, being towed.

The improved type of hitch is even better than the horse hitch, inasmuch as the present invention carries the drag more even and the short coupling brings the harrow closer to the tractor whereby the draft action will be lightened.

The particular location of the wheels permit employment of shorter bars whereby the device may be taken through gates when the harrows are connected with the hook 27 upon the hitch device, and track thereafter.

The invention is susceptible of various changes in its form, proportions and minor details of construction, and the right is herein reserved to make such changes as properly fall within the scope of the appended claims.

Having thus described the invention, what is claimed is:—

1. A hitch device comprising a wheeled tongue having brace members, a bar horizontally disposed upon the tongue and braces in advance of said wheels, a truss supported at an intermediate point in its length upon the upper side of the tongue and having connection at its ends with the extremities of said bar, yokes extending rearwardly from the ends of said bar, and chain connections carried by the yokes being eccentrically connected with implements tracking thereafter.

2. A hitch device comprising a wheeled tongue having brace members, a bar horizontally disposed upon the tongue and braces in advance of said wheels, a truss supported at an intermediate point in its length upon the upper side of the tongue and having connection at its ends with the extremities of said bar, yokes extending rearwardly from the ends of said bar, and chain connections carried by the yoke being eccentrically connected with joined implements tracking thereafter.

In testimony whereof I affix my signature.

TILLMAN SCRABECK.